UNITED STATES PATENT OFFICE.

GEORGE J. COLLINS, OF BROOKLYN, NEW YORK.

IMPROVEMENT IN CAPSULED INK-POWDERS.

Specification forming part of Letters Patent No. 216,832, dated June 24, 1879; application filed March 26, 1879.

*To all whom it may concern:*

Be it known that I, GEORGE J. COLLINS, of Brooklyn, in the county of Kings and State of New York, have invented certain new and useful Improvements in Capsuled Ink-Powders, of which the following is a specification.

This invention relates to a new article of manufacture, consisting of ink-powder inclosed in a soluble casing or capsule, its object being to produce an article which can be handled without the inconvenience of soiling the hands or dress, which can be readily transported in small compass, and from which ink or writing-fluid in desired quantities can be readily prepared at a moment's notice.

Heretofore ink-powders have been put up for sale in packages containing a considerable quantity, and, when desired for use, the proper amount is removed and dissolved in water. With the utmost care it is almost impossible to handle such loose powder without transferring a portion of it to the hands or surrounding objects. This renders the use of such powders objectionable, owing to the nature of the same and their liability to soil and injure everything they come in contact with.

By my invention these objections are entirely obviated.

In carrying out my invention I construct a capsule in two parts, closed at one end and open at the other. The open end of one part is adapted to fit over the open end of the other, so that the ink-powder may be securely inclosed between said parts.

The capsule is composed of some soluble substance—such as gelatine or the various gums—that will not be injurious to the ink, and the structure of which capsule will be destroyed by the action of water, in order to liberate the powder. In the capsules thus constructed is inclosed ink-powder of any description, composition, or color, from which a liquid ink or writing-fluid can be prepared by simply dissolving a capsule in water.

The capsule, when composed of gum or gelatine, serves a twofold purpose—that is, it serves to hold the powder, and, when dissolved, imparts proper body to the ink, the gum usually employed in the powder being dispensed with or reduced in quantity.

Owing to the great intensity of the aniline colors, I generally employ one of such colors as a basis, although other colors or compounds may be used without changing the character of my invention.

For a carmine ink I take eosine, forty parts; nitrate of silver, three parts; gelatine, seven parts. For a purple ink I take Hoffman's violet or other aniline-violet, forty-four parts; gelatine, four parts; nitrate of silver, two parts. For a green ink I take aniline-green, forty-four parts; gelatine, four parts; nitrate of silver, two parts.

In preparing the powder ready to be introduced into the capsules, I first comminute or reduce to a fine powder the several ingredients of the above formulæ for the respective colored inks, and then thoroughly mix and incorporate the several substances together, the mixed powder so formed being then ready to be placed into the capsules.

To make a carmine writing-fluid, I take a capsule containing, say, fifteen (15) grains of the ink-powder and place it in about three fluid ounces of clean water, it requiring about one hour for the capsule to dissolve. To prepare a purple writing-fluid, a capsule containing fifteen (15) grains of the powder is dissolved in about one pint of water; and to prepare a green ink, the same, or about the same, quantities are employed as for the purple ink.

The entire proportion of the gelatine in the formula for any of the inks may be included in the capsule or integument or casing, or a certain number of the parts of the gelatine may be powdered and the remainder form the capsule or casing.

Having thus described my invention, what I claim is—

As a new article of manufacture, an ink-powder inclosed in a soluble gelatinous integument or casing, substantially as and for the purpose described.

In testimony that I claim the foregoing I have hereunto set my hand in the presence of the subscribing witnesses.

GEORGE J. COLLINS.

Witnesses:
  M. G. SESNOR,
  PETER LIDDELL.